F. KARPY.
HORSESHOE.
APPLICATION FILED MAR. 30, 1918.

1,277,219.

Patented Aug. 27, 1918.

INVENTOR
Frank Karpy
BY
ATTORNEY

UNITED STATES PATENT OFFICE.

FRANK KARPY, OF CLEVELAND, OHIO.

HORSESHOE.

1,277,219.    Specification of Letters Patent.    Patented Aug. 27, 1918.

Application filed March 30, 1918.    Serial No. 225,622.

*To all whom it may concern:*

Be it known that I, FRANK KARPY, a citizen of Russia, resident of Cleveland, county of Cuyahoga, and State of Ohio, have invented certain new and useful Improvements in Horseshoes, of which the following is a specification.

This invention relates to improvements in horseshoes and particularly to means for engaging the same with the hoofs of the animal.

The principal object of the invention is to provide a horseshoe engageable by means of exchangeably attached arms extending over the upper portion of the hoof, the arms carrying securing means by which the shoe may be firmly clamped in position.

A further object is to provide a horseshoe which may be attached to the hoof without the use of nails, screws or like securing means, and a still further object is to provide a shoe which will not press to an undesirable extent upon the upper portion of the hoof.

These and other like objects are attained by the novel construction and combination of parts hereinafter described, and shown in the accompanying drawing forming a material part of this disclosure, and in which:—

Figure 1:
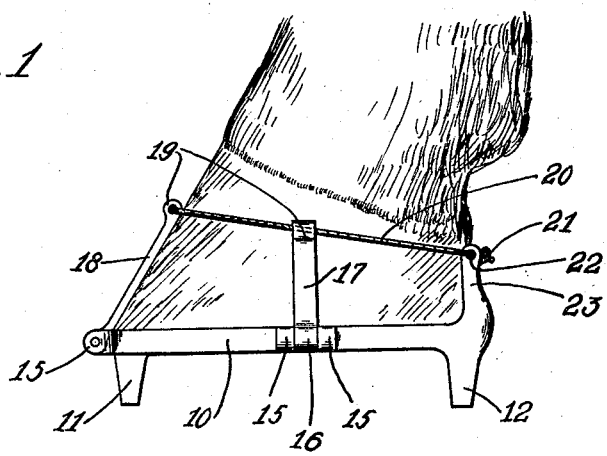
Figure 1 is a side elevational view of a shoe made in accordance with the invention, and indicating its application.
Figure 2:
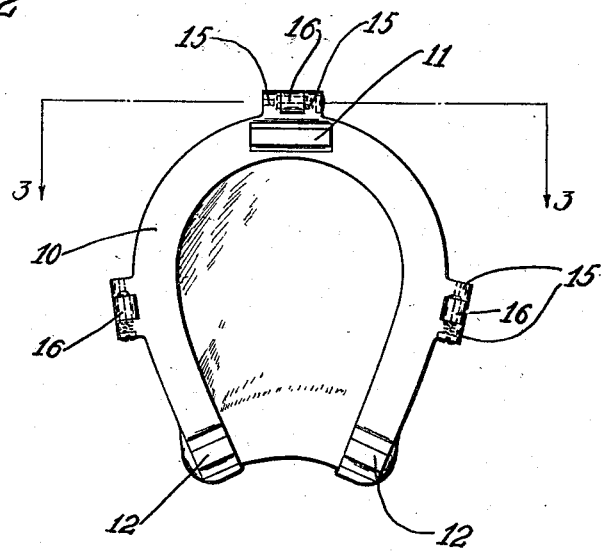
Fig. 2 is a bottom plan view of the same.
Figure 3:
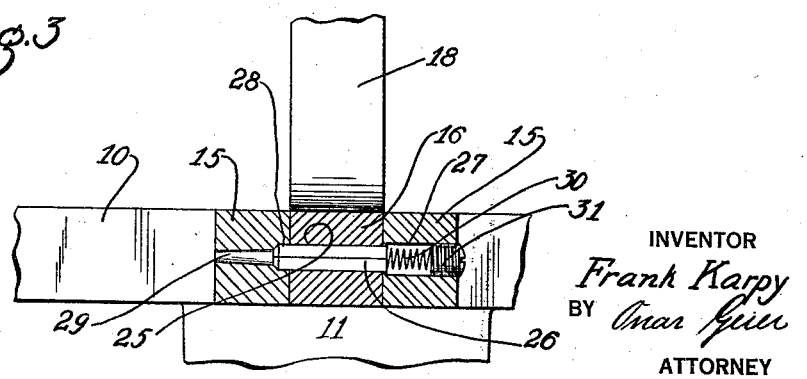
Fig. 3 is an enlarged transverse sectional view, taken on line 3—3 of Fig. 2.

In the drawing, the numeral 10 represents a conventional type of horseshoe, provided with integrally formed toe and heel calks 11 and 12 respectively, whereby the animal is prevented from slipping and is able to secure a firm grip upon the surface over which it travels.

Formed with the sides of the shoe, and also with the toe thereof, are spaced pairs of outstanding lugs 15, the same being in the plane of the body of the shoe, the lugs being adapted to receive between them the hub ends 16 of levers 17 and 18 respectively at the sides and toe of the shoe, the same having a substantially flat level back adapted to contact with the upper portion of the hoof and provided with heads at their outer ends having openings 19, through which are inserted securing means, as a cord, cable, or wire 20, the ends of which are secured by knots 21, after passing through openings 22 formed in upstanding projections 23 integrally formed with the heel of the shoe, thus holding the levers 17 and 18 tightly against the hoof.

In order to prevent the levers pressing unduly against the hoof, square openings 25 are formed through the lower ends of the levers 17 and 18, engageable with each of which is a square pin 26, entering through the passage 27 in one of the lugs 15 and engaging with a corresponding square recess 28 formed in the opposite lug, and from which extends an outer opening 29 so that the pin may be pressed backward, opposing the spring 30 pressed into engagement with the rear end of the square pin 26, by the screw 31, so that thus the levers 17 and 18 are prevented from clamping against the surface of the hoof to an undesired extent.

Having thus described my invention, what I claim as new and desire to secure by Letters Patent, is:

1. A horseshoe comprising a body portion, pairs of lugs extending at the front and sides thereof, said lugs being in the plane of the body of the shoe, raised projections at the heel of said shoe, levers having rectangular openings engageable between each of said pairs of lugs, said levers being adapted to extend upward over the hoof and containing openings at the upper end, flexible engaging means passing through said openings, securing means comprising a spring and screw for said levers engageable with the said lugs, and rectangular pins suited to said lugs and adapted to limit the motion of said levers.

2. A horseshoe comprising a rigid body portion having pairs of extending lugs formed at the sides and the toe thereof, levers engaging between said pairs of lugs, said levers being adapted to extend upward over the hoof, means for clamping said levers against the hoof, the lower ends of said levers containing rectangular openings, pins suited to the mentioned openings, said pins being engaged in recesses formed in said lugs, springs adapted to press said pins into operative engagement, and means permitting the disengagement of said pins.

In testimony whereof I have affixed my signature.

FRANK KARPY.

Copies of this patent may be obtained for five cents each, by addressing the "Commissioner of Patents, Washington, D. C."